United States Patent [19]

Kraus

[11] Patent Number: 4,691,324
[45] Date of Patent: Sep. 1, 1987

[54] ELECTRODE CONNECTION

[75] Inventor: Günter Kraus, Ehekirchen, Fed. Rep. of Germany

[73] Assignee: Sigri GmbH, Meitingen bei Augsburg, Fed. Rep. of Germany

[21] Appl. No.: 833,846

[22] Filed: Feb. 26, 1986

[30] Foreign Application Priority Data

Feb. 27, 1985 [DE] Fed. Rep. of Germany ....... 3506908

[51] Int. Cl.$^4$ .............................................. H05B 7/14
[52] U.S. Cl. .................................................... 373/91
[58] Field of Search ............................ 373/91, 92, 93; 403/DIG. 5, 296, 292, 305, 306

[56] References Cited

U.S. PATENT DOCUMENTS 2,527,294 10/1950 Balley .
3,646,240 2/1972 Lewis .
4,161,619 7/1979 MarKanan et al. .

FOREIGN PATENT DOCUMENTS

| 259888 | 4/1967 | Austria . |
| 1054193 | 12/1963 | Fed. Rep. of Germany . |
| 2234411 | 6/1976 | Fed. Rep. of Germany . |
| 2657952 | 2/1979 | Fed. Rep. of Germany . |
| 3131588 | 7/1982 | Fed. Rep. of Germany . |
| 2555688 | 9/1984 | Fed. Rep. of Germany . |
| 889252 | 2/1962 | United Kingdom . |
| 985878 | 11/1963 | United Kingdom . |
| 575792 | 10/1977 | U.S.S.R. ................. 373/92 |

Primary Examiner—Roy N. Envall, Jr.
Attorney, Agent, or Firm—Herbert L. Lerner; Laurence A. Greenberg

[57] ABSTRACT

Connection between the sections of a graphite electrode in whose faces a socket is sunk to accommodate a threaded nipple. The socket base has a rotation-symmetrical recess whose principal sections are defined by a second or higher order curves and go over into the socket generating surface continuously differentiably. The annular stress active in the connection zone is reduced in particular by the recess.

9 Claims, 5 Drawing Figures

ELECTRODE CONNECTION

BACKGROUND OF THE INVENTION

1. Field of the Invention

The invention relates to an electrode connection between the sections of carbon or graphite electrodes in whose faces are sunk, for the accommodation of double-conical threaded nipples, threaded sockets of truncated-cone shape and rotation symmetrical recesses emanating from the socket base.

2. Description of the Prior Art

Graphite and carbon electrodes, hereinafter called graphite electrodes used in arc furnaces, particularly for the production of electric steel, consist of at least two, and usually a string of three or more cylindrical sections interconnected mechanically and electrically. The electrode is gradually consumed during the operation of the furnace, and as replacement of the losses caused primarily in the lower part of the electrode string, such as by evaporation of the carbon in the arc, erosion and oxidation, a new graphite section is periodically attached to the graphite section at the upper end of the electrode string. The various sections of the electrode string are screwed together, especially by means of double-conical threaded nipples screwed into double-conical recesses of truncated-cone shape—hereinafter called sockets—sunk into the faces of the electrode sections.

During the operation of the arc furnace, the electrode string is subjected to major stresses, e.g. due to radial temperature gradients, bending stresses due to scrap cave-ins and tensile stresses due to the electrode string's own weight. Since the nipple and electrode sections usually consist of two different graphite grades having different mechanical, thermal and electrical properties, the thermally induced stresses are particularly great in the connection zone, and under these conditions it is not possible to completely preclude fractures of the connection, causing graphite losses and especially furnace operation troubles. To limit the thermally induced stresses, it has been proposed to use nipples whose coefficient of thermal expansion is smaller in the radial direction than the coefficient of expansion of the adjacent electrode section measured in the same direction (German DE-PS No. 1,054 193 corresponding to British Patent Specification No. 889,252). Due to the anisotropic nature of the graphite part, a reduction in the axial tensile strength of the nipple and, above all, an increase in the generation of joulean heat in the nipple must be tolerated. Therefore, the disadvantages of such material changes usually counterbalance the advantages so that changes in the geometry of the nipple and the socket are preferred to relieve the nipple connections. The greatest stresses occur in the area of the nipple equator and especially in the transition zone between the socket base and the first thread turns of the socket in engagement with the nipple thread. In these areas, the accumulated stresses are often greater than the breaking strength of the graphite, and crack formation occurs and, in the extreme case, also breakage of the nipple, socket or both parts. Various solutions have been suggested to limit the build-up of stresses, especially in the transition zone from the socket base to the screw thread. For example, a connection is known from German DE-PS No. 25 55 688 in which the depth of the socket thread decreases steadily towards the socket base as does the depth of the nipple thread towards the nipple equator, thereby reducing stress peaks in the respective first thread turns. It is known from another suggestion to remove, by undercutting, the thread turns of the socket not in engagement with the nipple thread, thereby increasing the notch angle (German DE-AS No. 22 34 411 corresponding to British Patent Specification No. 1 388 746). The thread cross section is expediently shortened in the undercut zone, and the thread flanks facing the socket opening are cut at an angle no greater than a right angle due to the shortening (German DE-AS No. 26 57 952). The essential purpose of these measures is to reduce the stress on the socket in this critical area. According to German DE-OS No. 31 31 588, a relief of the thread turns from compressive stresses in the transition zone of the socket base and a reduction of the very great current density in this area is supposed to be achieved, finally, in that the resistance moment of the nipple is lessened by rotation-symmetrical recesses emanating from its face such that the nipple yields elastically when under radial bending stress. This recess extends at least over the height of the first three engaged thread turns, and their contour is designed so that the tangent with the nipple axis includes an angle greater than 0° at any point. In another group of suggested solutions, socket and nipple were to be relieved particularly of tensile stresses by means of slots, grooves or holes. Slots extend essentially parallel to the electrode axis transversely through the socket wall or nipple (U.S. Pat. No. 2,527,294) or axis-parallel holes are machined into the socket wall (Austrian Pat. No. 259 888 corresponding to British Patent Specification No. 985,878).

Relieving local stress peaks in the joint is generally not sufficient to completely preclude breakage of the connection. Therefore, others have attempted to transfer active stresses into those parts of the electrode string which are stressed in compression. U.S. Pat. No. 3,646,240 discloses an electrode connection whose socket bases are recessed in vault-fashion. In the extreme case the vaulted recess is a hemisphere with the socket area as the cross section. Preferred are hemispheres with larger diameters than the socket. In this embodiment, the forces acting upon the connection are to be transferred into the electrode sections without the build-up of destructive stress concentrations. Another embodiment, (U.S. Pat. No. 4,161,619) provides for a flatter recess below the socket base, the last flank of the socket thread transitioning with uniform curvature into the plane limiting surface of the recess. The curvature radius is to be 12 to 18 mm, approximately.

SUMMARY OF THE INVENTION

It is an object of the invention to relieve the connection between the electrode sections of thermomechanical and mechanical stresses to a greater extent than through the suggested procedures which have become known; to improve the stress transfer into the electrode section area under compression; and to prevent the build-up of stress peaks in the socket base so that at least no cracks leading to the breakage of the electrode string are formed during the operation of the electrode in the area of the connection.

With the foregoing and other objects in view, there is provided in accordance with the invention an electrode connection between sections of carbon or graphite electrodes in whose faces are sunk, for the accommodation of double-conical threaded nipples with flat faces, threaded sockets of truncated-cone shape and rotation-symmetrical recesses emanating from the socket base, wherein (a) principle sections of the rotation-symmetrical recesses are defined by curves of the second or higher order, (b) transition between the envelope of the socket thread and the defining curve is a continuously differentiable curve, and (c) the defining curve forms right angles with a normal erected at the base of the envelope and with an axis of symmetry of the principle section.

Other features which are considered as characteristic for the invention are set forth in the appended claims.

Although the invention is illustrated and described herein as embodied in an electrode connection, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

In an electrode connection of the kind described at the outset, with rotation-symmetrical recesses emanating from the socket base, the problem is solved in that (a) the principle sections of the rotation-symmetrical recesses are defined by curves of the second or higher order, (b) the transition between the envelope of the socket thread and the defining curve is a continuously differentiable curve, and (c) the defining curve forms right angles with the normal erected at the base of the envelope and with the axis of symmetry of the principle section.

Principle sections of the recesses sunk into the electrode sections so as to emanate from the base or bottom of the socket contain as the axis of symmetry the axis of rotation of the electrode string. The recess is formed by turning the principle section about this axis. Each principle section is defined by at least a second order curve which goes over into the envelope of the socket thread so as to be continuously differentiable. Generally, the envelope is a cone envelope whose generating lines form the cone angle alpha. The continuous differentiability requires the defining curve to form right angles with the normal erected at the base of the envelope and with the axis of symmetry of the principle section. In a preferred embodiment, the transition between the envelope of the socket thread and the defining curve is formed by arcs of circles whose centers lie on the normal erected at the base of the envelope. It is expedient for the arc length to be $r(\pi/2 - \alpha/2)$. Generally the shape of the defining curves is $y = a_1 x^n + a_2 x^{n-1} \ldots a_{n-1} x + a_n$ with $n \geq 2$. Preferred are curves whose bases are flattened and whose surface of rotation is of watchglass shape. In another advantageous embodiment, the principle sections are defined by third order curves whose minima lie on the axis of symmetry of the section. These recesses have two central bulges through which the main stress is further relocated towards the axis of rotation of the electrode. The socket thread design does not differ from the known embodiments or, in a preferred embodiment, the last thread turn is undercut so that an additional relief of the stresses in the transition zone from thread to recess is obtained.

In essence, the advantage of the connection between the sections of graphite electrodes according to the invention is that not only local stress increases in the connection are relieved, but that the total mechanical stress is reduced by the superposition of tensile stresses caused by the thermal expansion of the nipple and radial compressive stresses stemming from the expansion of the electrode sections. The resulting annular stress is smaller than in the previously known connections by about 20 to 40%.

The invention is explained below by way of example with reference to drawings.

Figure 1:
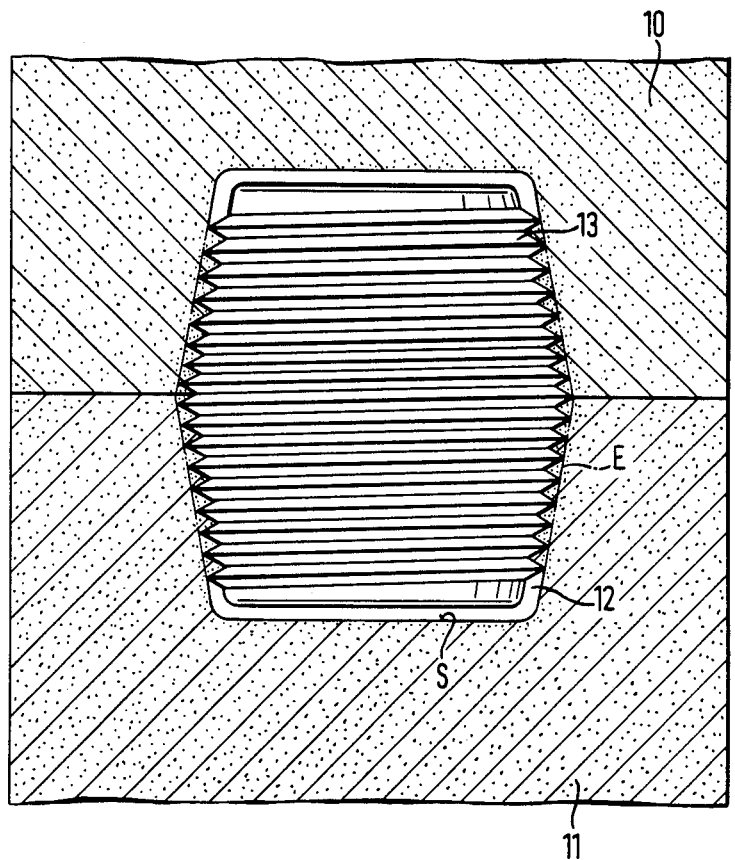
FIG. 1 is a vertical section of a conventional electrode connection in which threaded sockets of truncated-cone shape are sunk in the end faces of two sections of a graphite electrode and the two sections screwed together with a double-conical threaded nipple.
Figure 2:
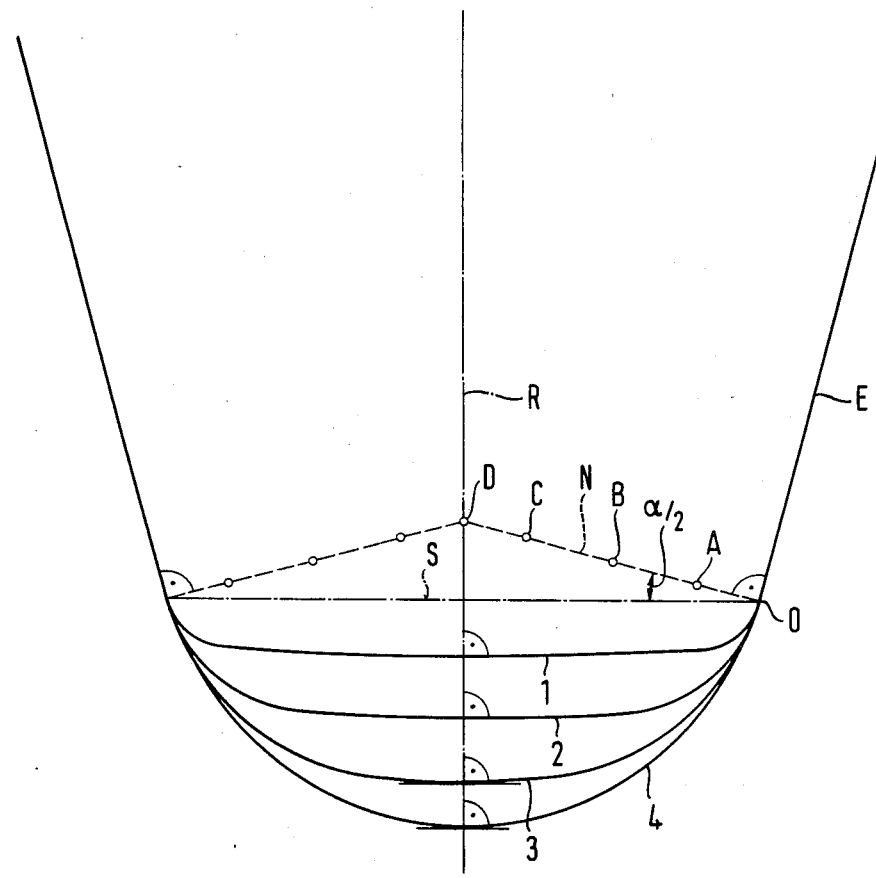
FIG. 2 is a schematic view of several recesses in accordance with the invention which emanate from the socket base and are sunk into the electrode sections and whose defining curves are second or higher order curves in a principle section.
Figure 3:
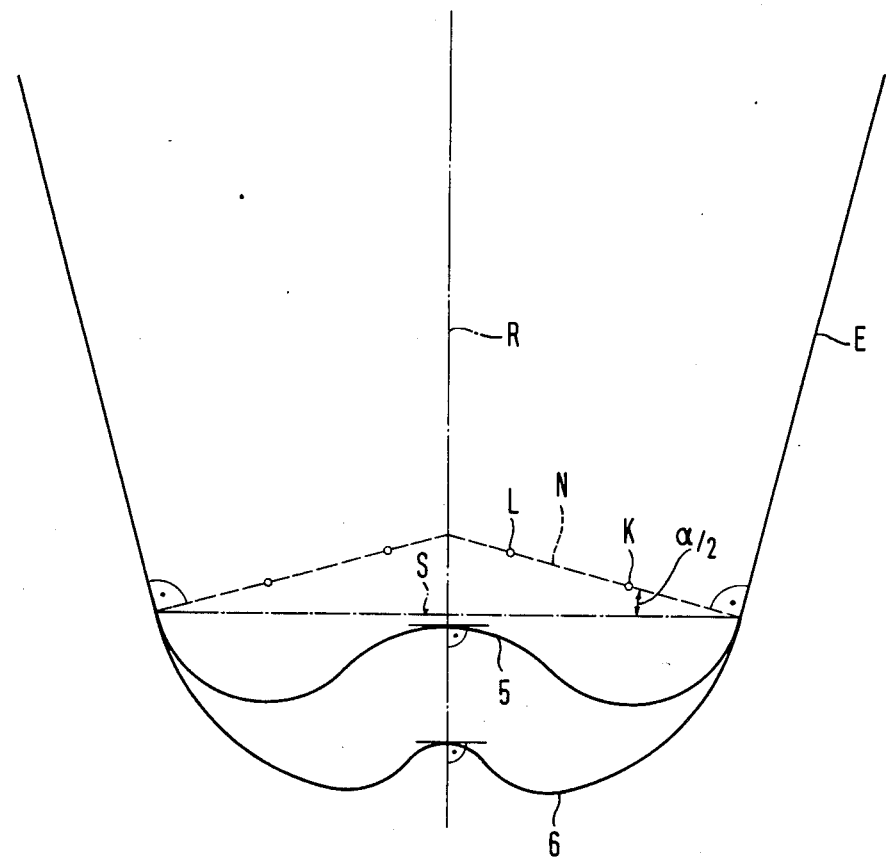
FIG. 3 is a schematic view of two recesses with a bulged central section in accordance with the invention.
Figure 4:
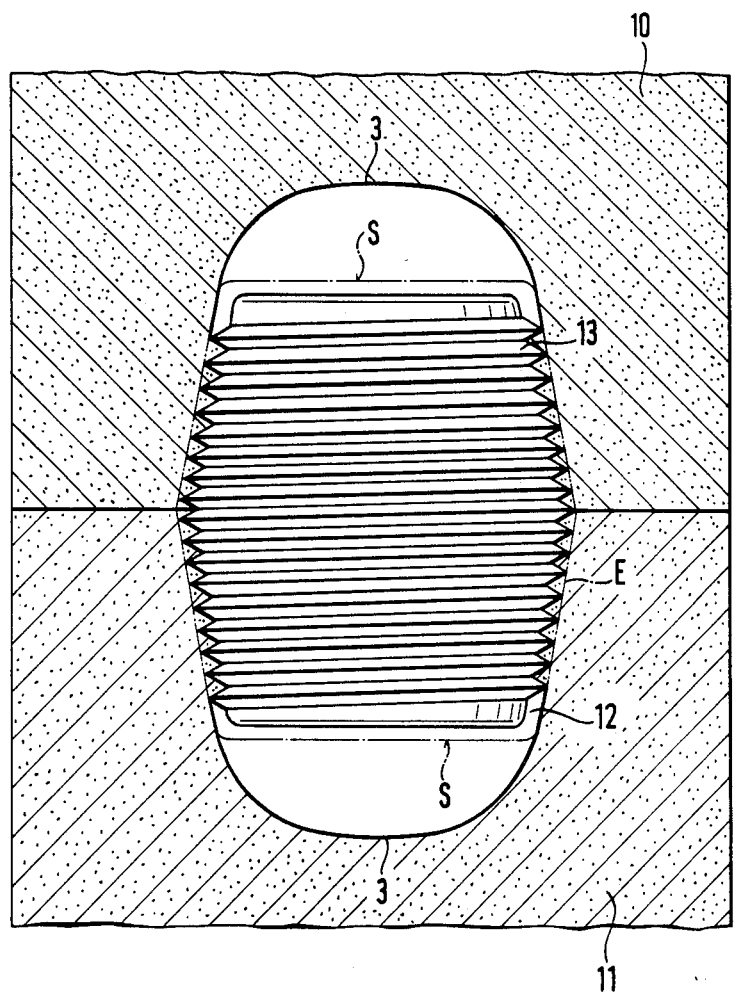
FIG. 4 discloses recesses emanating from the base surface S according to the curve 3 in FIG. 2.
Figure 5:
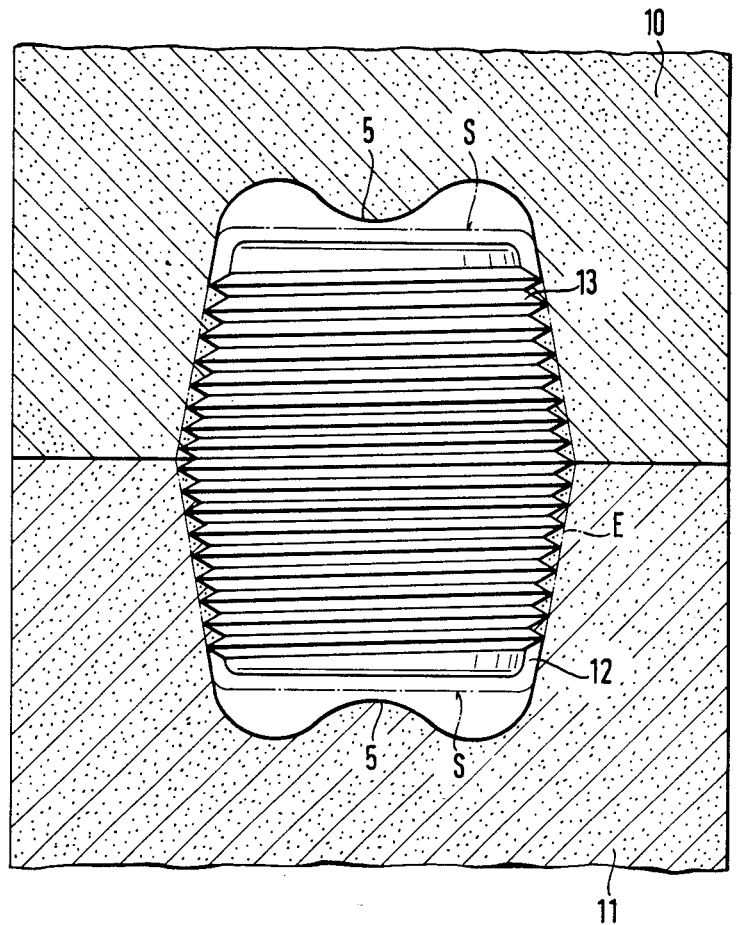
FIG. 5 discloses recesses emanating from the base surface S according to the third order curve 5 in FIG. 3.

In the conventional nipple connection shown in FIG. 1, are two sections 10 and 11 of a graphite electrode in whose end faces are sunk threaded sockets 12 of truncated-cone shape. Both sections are screwed together with the double-conical threaded nipple 13. E is the cone envelope enveloping the socket thread, or the envelope for short; S is the base surface or the socket base. Shown in FIG. 2 are four recesses which emanate from the base surface S and are sunk into the electrode sections and whose defining curves 1, 2, 3 and 4 are second or higher order curves in a principle section. The transition from the envelope E to the curves is formed by arcs of circles, their centers A, B, C and D lying on the normal N with the base 0. The angle included by the normal N and the socket base S is one-half the cone angle alpha/2 of the socket cone. In the defining curves 1, 2, 3 shown by way of example, the arcs change into a central straight portion which is essentially parallel to the original socket base S. Accordingly, the shape of the recess is that of a watch glass. All curves form right angles with the normal N at the base 0 and with the axis of symmetry or axis of rotation R of the nipple string. Shown in FIG. 3 are principle sections defined by the third order curves 5 and 6. The associated centers of the transition arcs are K and L. The minima of the curves lie on the axis of symmetry R, and the defining surface of the recesses formed by rotation contains correspondingly a central curvature.

There is claimed:

1. Electrode connection between sections of carbon or graphite electrodes in whose faces are sunk, for the accomodation of double-conical threaded nipples with flat faces, threaded sockets of truncated-cone shape, a cone envelope enveloping the socket thread, and rotation-symmetrical recesses emanating from the socket base, wherein
- (a) principle sections of the rotation-symmetrical recesses are defined by curves of the second or higher order,
- (b) transition between the envelope of the socket thread and the defining curve is a continuously differentiable curve, and
- (c) the defining curve forms right angles with a normal erected at the base of the envelope and with an axis of symmetry of the principle section.

2. Electrode connection according to claim 1, wherein the transition between the envelope of the socket thread and the defining curve is formed by arcs of circles, and the center of each arc lies on the normal erected at the base of the envelope.

3. Electrode connection according to claim 2, wherein the arc length of the transition curve is $r(\pi/2 - \alpha/2)$, wherein the envelope is a cone envelope whose generating lines form the cone angle alpha, and wherein r is the radius of the arcs of circles forming the transition between the envelope and the defining curves of the recess.

4. Electrode connection according to claim 1, wherein the principle sections are defined by a curve of watch-glass shape.

5. Electrode connection according to claim 2, wherein the principle sections are defined by a curve of watch-glass shape.

6. Electrode connection according to claim 3, wherein the principle sections are defined by a curve of watch-glass shape.

7. Electrode connection according to claim 1, wherein the principle sections are defined by a third-order curve.

8. Electrode connection according to claim 2, wherein the principle sections are defined by a third-order curve.

9. Electrode connection according to claim 3, wherein the principle sections are defined by a third-order curve.

* * * * *